United States Patent
Merrifield et al.

(10) Patent No.: US 12,321,768 B2
(45) Date of Patent: *Jun. 3, 2025

(54) VIRTUAL NON-UNIFORM MEMORY ACCESS (NUMA) LOCALITY TABLE FOR NUMA SYSTEMS

(71) Applicant: VMware LLC, Palo Alto, CA (US)

(72) Inventors: Timothy Merrifield, Austin, TX (US); Petr Vandrovec, Cupertino, CA (US); Xunjia Lu, Los Altos, CA (US); James White, Seattle, WA (US)

(73) Assignee: VMWare LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,373

(22) Filed: Feb. 20, 2024

(65) Prior Publication Data

US 2024/0192976 A1 Jun. 13, 2024

Related U.S. Application Data

(63) Continuation of application No. 17/376,070, filed on Jul. 14, 2021, now Pat. No. 11,941,422.

(51) Int. Cl.
*G06F 9/455* (2018.01)

(52) U.S. Cl.
CPC ...... *G06F 9/45554* (2013.01); *G06F 9/45558* (2013.01)

(58) Field of Classification Search
CPC .................. G06F 9/45554; G06F 9/45558
See application file for complete search history.

*Primary Examiner* — Gregory A Kessler
(74) *Attorney, Agent, or Firm* — Quarles & Brady LLP

(57) ABSTRACT

Various approaches for exposing a virtual Non-Uniform Memory Access (NUMA) locality table to the guest OS of a VM running on NUMA system are provided. These approaches provide different tradeoffs between the accuracy of the virtual NUMA locality table and the ability of the system's hypervisor to migrate virtual NUMA nodes, with the general goal of enabling the guest OS to make more informed task placement/memory allocation decisions.

20 Claims, 6 Drawing Sheets

PHYSICAL SLIT 200

|  | PHYSICAL NUMA NODE 0 | PHYSICAL NUMA NODE 1 | PHYSICAL NUMA NODE 2 | PHYSICAL NUMA NODE 3 |
|---|---|---|---|---|
| PHYSICAL NUMA NODE 0 | 1.0 | 1.5 | 3.0 | 3.0 |
| PHYSICAL NUMA NODE 1 | 1.5 | 1.0 | 3.0 | 3.0 |
| PHYSICAL NUMA NODE 2 | 3.0 | 3.0 | 1.0 | 1.5 |
| PHYSICAL NUMA NODE 3 | 3.0 | 3.0 | 1.5 | 1.0 |

VIRTUAL NON-UNIFORM MEMORY ACCESS (NUMA) LOCALITY TABLE FOR NUMA SYSTEMS

CROSS-REFERENCE TO RELATED APPLICATION

This application is a continuation of U.S. patent application Ser. No. 17/376,070 filed on Jul. 14, 2021, the disclosure of which is incorporated by reference herein.

BACKGROUND

Unless otherwise indicated, the subject matter described in this section is not prior art to the claims of the present application and is not admitted as being prior art by inclusion in this section.

Large memory and compute systems are typically designed with multiple processor sockets, each directly attached to a pool of local memory and indirectly attached to the local memories of other processor sockets (i.e., remote memories) via an interconnect or bus. This architecture is known as a Non-Uniform Memory Access (NUMA) architecture because each processor socket can access data in its local memory faster (i.e., with lower latency) than data in remote memory. A grouping of a processor socket and its local memory is referred to as a NUMA node.

Due to the higher costs of remote memory accesses, it is important for system software to be aware of the memory topology of a NUMA system and the memory access latencies between NUMA nodes. Among other things, this allows the system software to make more informed task placement/memory allocation decisions and thus improve system performance. The Advanced Configuration and Power Interface (ACPI) specification defines a System Locality Information Table (SLIT) that system firmware can use to provide node-to-node latency information to system software.

In cases where a NUMA system serves as a virtualization host (i.e., is configured to run a hypervisor and virtual machines (VMs)), it is useful for the hypervisor to expose the system's physical SLIT, or at least some portion thereof, in the form of a "virtual SLIT" to the guest operating system (OS) of each VM. Like the system software of a bare-metal system, the guest OS can use this SLIT information to make intelligent task placement/memory allocation decisions in accordance with the system's underlying memory characteristics.

However, for various reasons, exposing a virtual SLIT to a guest OS is not a straightforward task. For example, if the VM is assigned a virtual NUMA topology with greater or fewer NUMA nodes than the physical NUMA topology, the physical SLIT cannot be passed as-is to the guest OS because of the differences between the two topologies. Further, if the hypervisor migrates a virtual NUMA node of the VM between physical NUMA nodes during the VM's runtime (for, e.g., load balancing or other purposes), the migration can invalidate the latency values in the virtual SLIT and thereby cause the guest OS to make erroneous decisions.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Certain embodiments are directed to various approaches that can be implemented by the hypervisor of a NUMA system for exposing a virtual SLIT to the guest OS of a VM running on the system. As described below, these approaches provide different tradeoffs between the accuracy of the virtual SLIT and the hypervisor's ability to migrate virtual NUMA nodes, with the general goal of enabling the guest OS to make more informed task placement/memory allocation decisions.

Although the examples and embodiments presented herein are described in terms of the System Locality Information Table (SLIT) that is defined in the ACPI specification, the techniques of the present disclosure may be applied to any similar table that is designed to provide locality information between NUMA nodes, such as node-to-node latency values, to system software. Accordingly, all references to "SLIT" in the present disclosure may be interchangeably replaced with the more generic term "NUMA locality table."

2. Example NUMA System and Physical SLIT

Figure 1A:
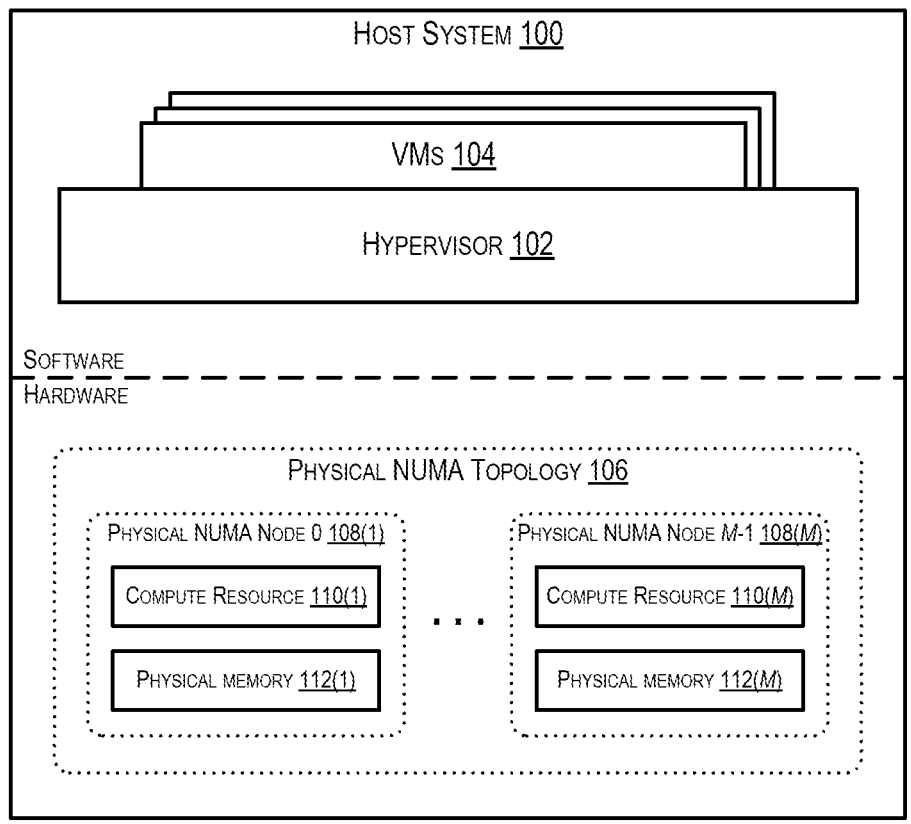
FIGS. 1A and 1B depict an example NUMA computer system.
Figure 1B:
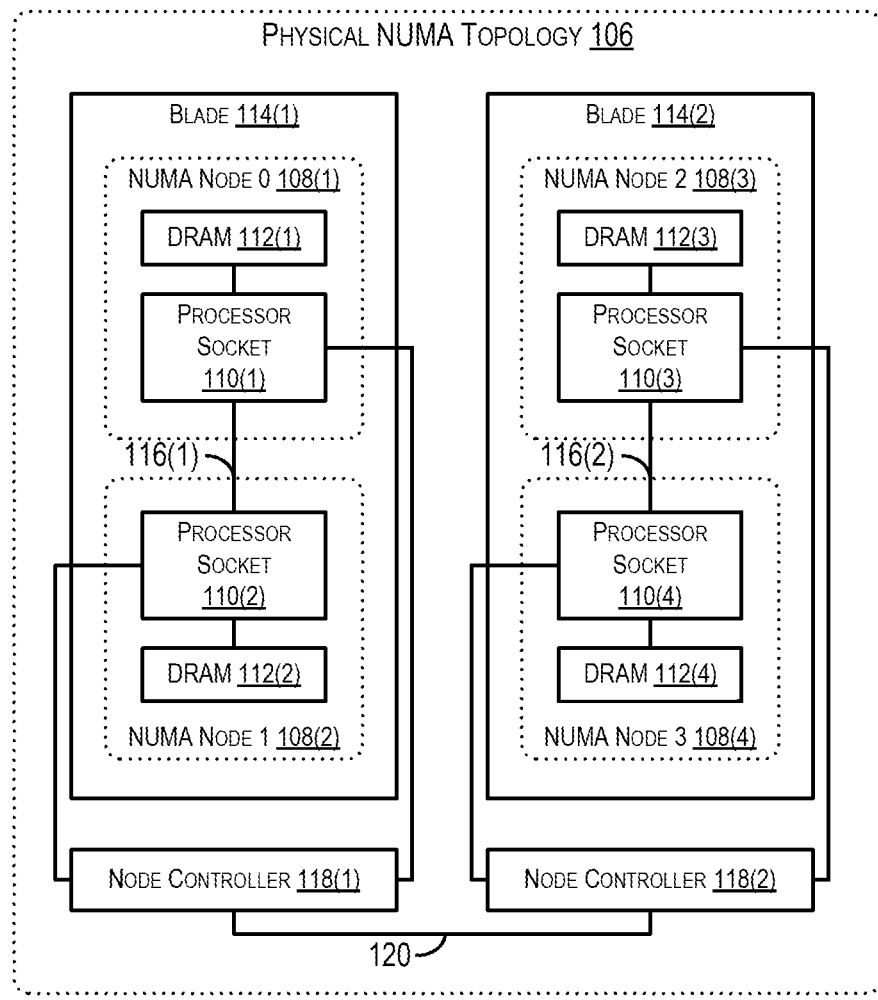

FIGS. 1A and 1B are simplified block diagrams of a NUMA computer system 100 in which embodiments of the present disclosure may be implemented. As shown in FIG. 1A, NUMA system 100 includes a hypervisor 102 and one or more VMs 104 in software, as well as a physical NUMA topology 106 comprising M physical NUMA nodes 108 (identified via indices 0 to M−1) in hardware. Each physical NUMA node 108 is a logical grouping of a compute resource 110 and a physical memory 112 of NUMA system 100 that exhibits the property of "non-uniform memory access," which means that the compute resource is able access the physical memory of its NUMA node (referred to as local memory) faster—or in other words, with lower latency—than the physical memories of other NUMA nodes (referred to as remote memories).

FIG. 1B depicts an example configuration for physical NUMA topology 106 of system 100 that comprises four physical NUMA nodes 0 through 3 (references numeral 108(1)-108(4)). Physical NUMA nodes 0 and 1 reside on a first blade (i.e., motherboard module) 114(1) of NUMA system 100 and each includes a processor socket 110(1)/(2) with a directly-attached DRAM 112(1)/(2) (e.g., a DRAM that is accessed via an on-die memory controller of the processor socket). In addition, physical NUMA nodes 0 and 1 are coupled via an inter-socket interconnect 116(1) that allows processor socket 110(1) of node 0 to remotely access DRAM 112(2) of node 1 (referred to as "on-blade remote memory" from the perspective of processor socket 110(1)/node 0), and allows processor socket 110(2) of node 1 to remotely access DRAM 112(1) of node 0 (referred to as "on-blade remote memory" from the perspective of processor socket 110(2)/node 1).

Physical NUMA nodes 2 and 3 reside on a second blade 114(2) of NUMA system 100 and each includes a processor socket 110(3)/(4) with a directly-attached DRAM 112(3)/(4). Like nodes 0 and 1 of blade 114(1), physical NUMA nodes 2 and 3 are coupled via an inter-socket interconnect 116(2) that allows processor socket 110(3) of node 2 to remotely access DRAM 112(4) of node 3 (referred to as "on-blade remote DRAM" from the perspective of processor socket 110(3)/node 2), and allows processor socket 110(4) of node 3 to remotely access DRAM 112(3) of node 2 (referred to as "on-blade remote DRAM" from the perspective of processor socket 110(4)/node 3).

Finally, physical NUMA nodes 0 and 1 of blade 114(1) and physical NUMA nodes 2 and 3 of blade 114(2) are connected to node controllers 118(1) and 118(2) respectively, which in turn communicate with each other via an inter-blade bus 120. This allows processor sockets 110(1) and 110(2) of nodes 0 and 1 to remotely access DRAMs 112(3) and 112(4) of nodes 2 and 3 (referred to as "inter-blade remote DRAM" from the perspective of processor sockets 110(1) and 110(2)/nodes 0 and 1), and allows processor sockets 110(3) and 110(4) of nodes 2 and 3 to remotely access DRAMs 112(1) and 112(2) of nodes 0 and 1 (referred to as "inter-blade remote DRAM" from the perspective of processor sockets 110(3) and 110(4)/nodes 2 and 3).

Figures 2, 3:
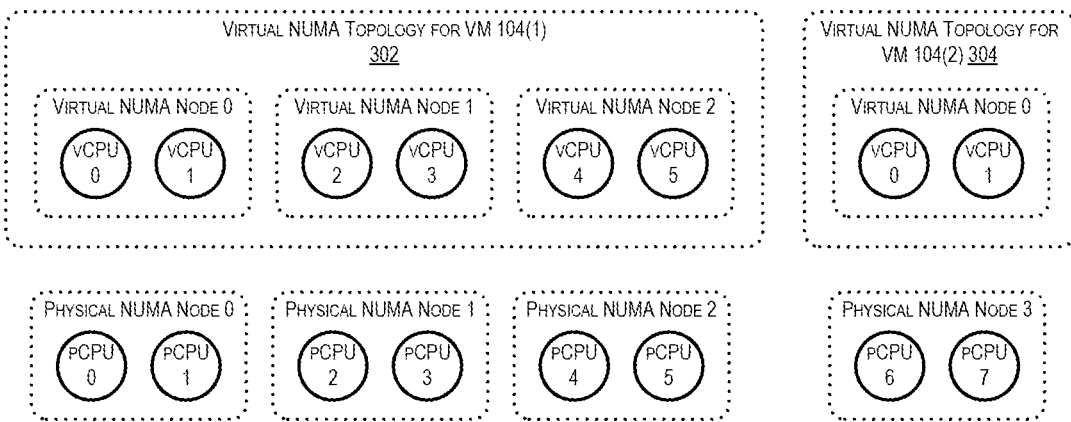
FIG. 2 depicts an example physical System Locality Information Table (SLIT).
FIG. 3 depicts example virtual NUMA topologies for two VMs.

The physical NUMA topology illustrated in FIG. 1B results in disparate memory access costs for local DRAM, on-blade remote DRAM, and inter-blade remote DRAM (with access to local DRAM being fastest, access to on-blade remote DRAM being slower, and access to inter-blade remote DRAM being slowest). FIG. 2 depicts an example physical SLIT 200 that can be generated by the system firmware of NUMA system 100 and communicated to hypervisor 102 in accordance with such a topology.

As shown in FIG. 2, physical SLIT 200 specifies a latency (also known as "distance") value for every pair of physical NUMA nodes (i, j) that indicates the relative latency of performing a memory access from node i to node j. These latency values are normalized against a base value of 1.0, which represents the latency of a node accessing its local memory (i.e., itself). Thus, for example, the latency value of 1.5 shown in physical SLIT 200 for the node pair (0, 1) indicates that the latency for processor socket 110(1) of node 0 to access the on-blade remote DRAM (i.e., DRAM 112(2)) of node 1 is 1.5 times longer than the latency for socket 110(1) to access its local DRAM 112(1). Similarly, the latency value of 3.0 shown in physical SLIT 200 for the node pair (0, 2) indicates that the latency for processor socket 110(1) of node 0 to access the inter-blade remote DRAM (i.e., DRAM 112(3)) of node 2 is 3.0 times longer than the latency for socket 110(1) to access its local DRAM 112(1).

3. Virtual NUMA and Virtual SLIT

In a NUMA system like system 100 of FIGS. 1A and 1B, the hypervisor can choose to expose a virtual NUMA topology to the guest OS of a VM based on various factors (e.g., the number of virtual central processing units (CPUs) provisioned for the VM, the amount of memory provisioned for the VM, etc.). This virtual NUMA topology includes one or more virtual NUMA nodes, each comprising a virtual CPU and associated memory, which the hypervisor "places"—or in other words, schedules for execution-on physical NUMA nodes of the system. For example, FIG. 3 depicts a scenario 300 in which VM 104(1) of FIG. 1A is presented a virtual NUMA topology 302 comprising three virtual NUMA nodes 0, 1, and 2 (each with two virtual CPUs), which hypervisor 102 has placed on physical NUMA nodes 0, 1, and 2 respectively. In addition, VM 104(2) is presented a virtual NUMA topology 304 comprising a single virtual NUMA node 0, which hypervisor 102 has placed on physical NUMA node 3. Generally speaking, the hypervisor will attempt to place virtual NUMA nodes on physical NUMA nodes in a manner that adheres to the virtual NUMA topology exposed to each VM, thereby optimizing VM performance.

The hypervisor can also expose a virtual SLIT to the guest OS of a VM that has a virtual NUMA topology, which enables the guest OS to take the virtual SLIT into consideration at the time of placing processes/threads on virtual CPUs and/or allocating memory. However, as mentioned previously, exposing a virtual SLIT that is based on the system's physical SLIT is challenging for several reasons. For instance, in the case of VM 104(1) shown in scenario 300, it is not possible to simply pass physical SLIT 200 to the VM's guest OS because physical SLIT 200 identifies four NUMA nodes (i.e., physical NUMA nodes 0, 1, 2, and 3) while guest OS is only aware of three NUMA nodes (i.e., virtual NUMA nodes 0, 1, and 2). Accordingly, the guest OS will reject physical SLIT 200 as being incorrect.

Further, even if hypervisor 102 were to expose a virtual SLIT to VM 104(1) that correctly mapped physical NUMA nodes 0, 1, and 2 to virtual NUMA nodes 0, 1, and 2, hypervisor 102 could potentially migrate, e.g., virtual NUMA node 0 from physical NUMA node 0 to another physical NUMA node at some point during the VM's runtime. In this scenario, the latency values for most node pairs in the virtual SLIT comprising virtual NUMA node 0 would be rendered invalid, which can cause the guest OS to make erroneous task placement/memory allocation decisions that adversely impact performance.

To address the foregoing and other similar problems, the following sections of this disclosure present three approaches that may be implemented by hypervisor 102 of NUMA system 100 for exposing a virtual SLIT to VMs 104. According to the first approach (referred to as "one-to-one static placement" and detailed in section (4) below), hypervisor 102 can establish a one-to-one mapping between a VM's virtual NUMA nodes and the system's physical NUMA nodes based on configuration information provided by a user/administrator. Hypervisor 102 can then expose a virtual SLIT to the VM that includes latency values from the physical SLIT in accordance with the mappings and can pin the virtual NUMA nodes to their mapped physical NUMA nodes, such that the virtual NUMA nodes remain in place throughout the VM's runtime (or in other words, are never migrated way from their mapped physical nodes). This approach ensures that the virtual SLIT will always specify the correct latency values for the VM's virtual NUMA nodes (as derived from latency values of their mapped physical NUMA nodes in the physical SLIT), at the expense of preventing any virtual NUMA node migrations.

According to the second approach (referred to as "one-to-many static placement" and detailed in section (5) below), hypervisor 102 can determine, for each virtual NUMA node of a VM, a set of physical NUMA nodes to which that virtual NUMA node is "affinitized" to (or in the words, may serve as a placement destination for the virtual NUMA node during the VM's runtime). This set may be defined by a user/administrator or by hypervisor 102. Hypervisor 102 can then build and expose a virtual SLIT to the VM's guest OS that specifies, for each virtual NUMA node pair (i, j), a latency value that is an average of the latency values in the physical SLIT for all physical NUMA node pairs (m, n) where m is in the affinitized set of physical NUMA nodes for virtual NUMA node i and where n is in the affinitized set of physical NUMA nodes for virtual NUMA node j. For example, assume virtual NUMA node 0 is affinitized to physical NUMA nodes 0 and 1 and virtual NUMA node 1 is affinitized to physical NUMA nodes 1 and 2. In this case, the virtual SLIT latency value for virtual NUMA node pair (0, 1) can be computed as the average of the physical SLIT latency values for physical NUMA node pairs (0, 1), (0, 2), (1, 1), and (1, 2).

With this one-to-many static placement approach, hypervisor 102 has greater flexibility in moving virtual NUMA nodes across physical NUMA nodes in response to runtime conditions because each virtual NUMA node is not limited to placement on a single physical NUMA node; instead, each virtual NUMA node can migrated to one of its multiple affinitized physical NUMA nodes. However, the latency information in the virtual SLIT will generally be less accurate (and thus less helpful to the guest OS) than the one-to-one static placement approach due to the averaged nature of each virtual SLIT latency value.

Finally, according to the third approach (referred to as "dynamic placement" and detailed in section (6) below), hypervisor 102 can build and expose a virtual SLIT to a VM's guest OS based on one-to-one mappings in a manner that is largely similar to one-to-one static placement approach. However, rather than determining these mappings based on a static user-provided configuration, hypervisor 102 can determine the mappings dynamically at the time of VM power-on based on various runtime factors (e.g., the current compute load on each physical NUMA node, the current memory load on each physical NUMA node, etc.).

Further, rather than strictly pinning each virtual NUMA node to its mapped physical NUMA node, hypervisor 102 can temporarily migrate each virtual NUMA node to different physical NUMA nodes on an as-needed basis. Accordingly, this approach provides a middle ground of virtual SLIT accuracy/migration flexibility in comparison to the one-to-one and one-to-many static placement approaches.

4. One-to-One Static Placement

Figure 4:
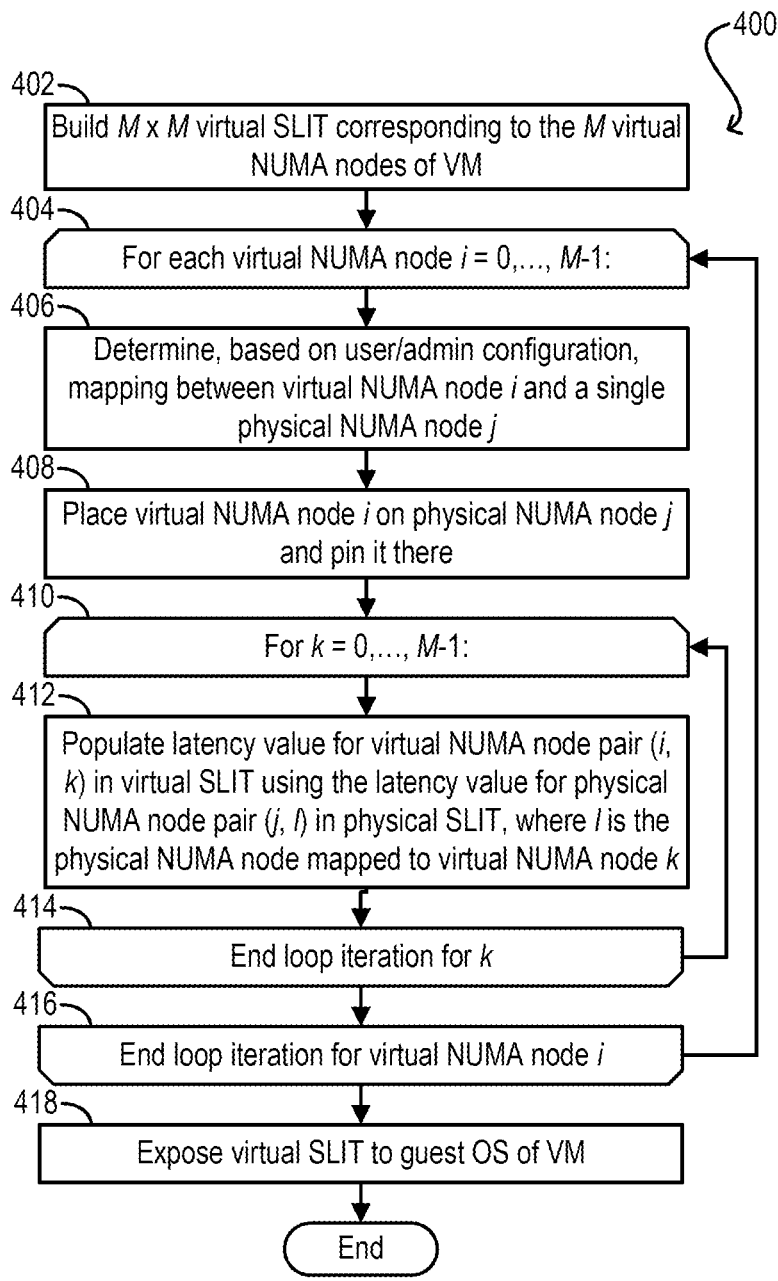
FIG. 4 depicts a workflow for exposing a virtual SLIT using one-to-one static placement according to certain embodiments.

FIG. 4 depicts a workflow 400 that may be carried out by hypervisor 102 of NUMA system 100 for exposing a virtual SLIT to a VM 104 using the one-to-one static placement approach according to certain embodiments. It is assumed that hypervisor 102 performs workflow 400 prior to initiating execution of VM 104 (e.g., at the time of VM power-on). In addition, it is assumed that hypervisor 102 has assigned VM 104 a virtual NUMA topology comprising M virtual NUMA nodes 0, . . . , M−1 and physical NUMA topology 106 of NUMA system 100 comprises N physical NUMA nodes 0, . . . , N−1.

Starting with block 402, hypervisor 102 can build an M×M virtual SLIT, where the rows and columns of the virtual SLIT correspond to the M virtual NUMA nodes of VM 104.

At block 404, hypervisor 102 can enter a first loop for each virtual NUMA node i=0, . . . , M−1. Within this first loop, hypervisor 102 can determine, based on configuration provided by a user or administrator, a mapping between virtual NUMA node i and a single physical NUMA node j (block 406). Hypervisor 102 can then place virtual NUMA node i on physical NUMA node j and pin it there, such that virtual NUMA node i cannot be migrated to any other physical NUMA node throughout the VM's runtime (block 408).

At block 410, hypervisor 102 can enter a second loop for k=0, . . . , M−1. Within this second loop, hypervisor 102 can populate the latency value for virtual NUMA node pair (i, k) in the virtual SLIT using the latency value for physical node pair (j, l) in the physical SLIT of NUMA system 100, where l is the physical NUMA node mapped to virtual NUMA node k (block 412). Hypervisor 102 can thereafter reach the end of the second and first loops (blocks 414 and 416) and repeat these loops as needed.

Finally, at block 418, hypervisor 102 can expose the virtual SLIT to the guest OS of VM 104 and workflow 400 can end.

5. One-to-Many Static Placement

Figure 5:
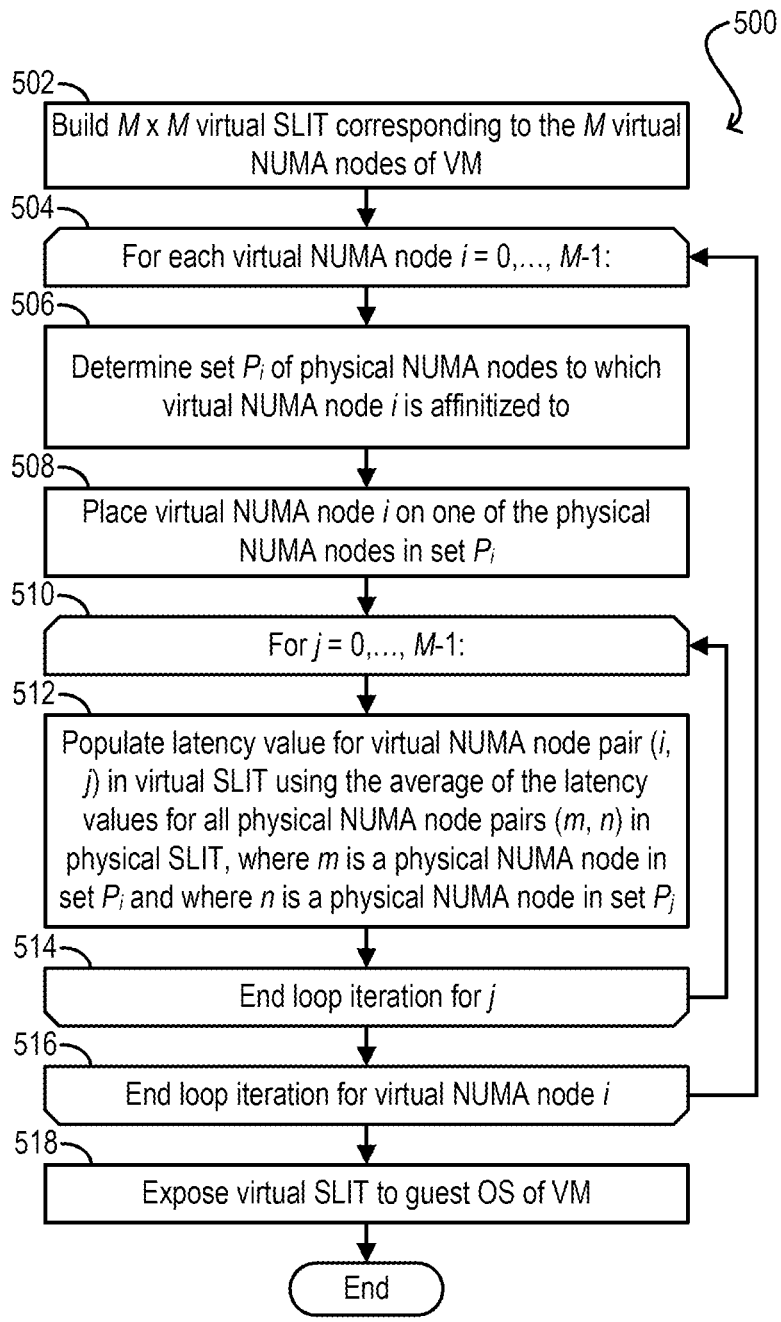
FIG. 5 depicts a workflow for exposing a virtual SLIT using one-to-many static placement according to certain embodiments.

FIG. 5 depicts a workflow 500 that may be carried out by hypervisor 102 of NUMA system 100 for exposing a virtual SLIT to a VM 104 using the one-to-many static placement approach according to certain embodiments. Like workflow 400 of FIG. 4, it is assumed that hypervisor 102 performs workflow 500 prior to initiating execution of VM 104 (e.g., at the time of VM power-on). In addition, it is assumed that hypervisor 102 has assigned VM 104 a virtual NUMA topology comprising M virtual NUMA nodes 0, . . . , M−1 and physical NUMA topology 106 of NUMA system 100 comprises N physical NUMA nodes 0, . . . , N−1.

Starting with block 502, hypervisor 102 can build an M×M virtual SLIT, where the rows and columns of the virtual SLIT correspond to the M virtual NUMA nodes of VM 104.

At block 504, hypervisor 102 can enter a first loop for each virtual NUMA node i=0, . . . , M−1. Within this first loop, hypervisor 102 can determine a set $P_i$ of physical NUMA nodes to which virtual NUMA node i is "affinitized" (and thus may act as a placement destination for virtual NUMA node i), where the size of $P_i$ is greater than 0 and less than or equal to N (block 506). In one set of embodiments, hypervisor 102 can determine set $P_i$ based on user/admin configuration; in other embodiments, hypervisor can simply construct set $P_i$ as including all of the physical NUMA nodes in NUMA system 100.

Hypervisor 102 can then place virtual NUMA node i on one of the physical NUMA nodes in $P_i$, without pinning it there (block 508).

At block 510, hypervisor 102 can enter a second loop for j=0, . . . , M−1. Within this second loop, hypervisor 102 can populate the latency value for virtual NUMA node pair (i, j) in the virtual SLIT using the average of the latency values for all physical NUMA node pairs (m, n) in the physical SLIT, where m is a physical NUMA node in $P_i$ (i.e., the set of physical NUMA nodes to which virtual NUMA node i is affinitized) and n is a physical NUMA node in $P_j$ (i.e., the set of physical NUMA nodes to which virtual NUMA node j is affinitized) (block 512).

Stated more formally, the latency value for virtual NUMA node pair (i, j) in the virtual SLIT (i.e., $latency_{i,j}$) can be computed as shown below. In this equation, $SLIT_{m,n}$ represents the latency value for physical NUMA node pair (m, n) in the physical SLIT.

$$latency_{i,j} = \frac{\sum SLIT_{m,n} | m \in P_i \wedge n \in P_j |}{|P_i \times P_j|}$$

Hypervisor 102 can thereafter reach the end of the second and first loops (blocks 514 and 516) and repeat these loops as needed. Finally, at block 518, hypervisor 102 can expose the virtual SLIT to guest OS of VM 104 and workflow 500 can end.

6. Dynamic Placement

Figure 6:
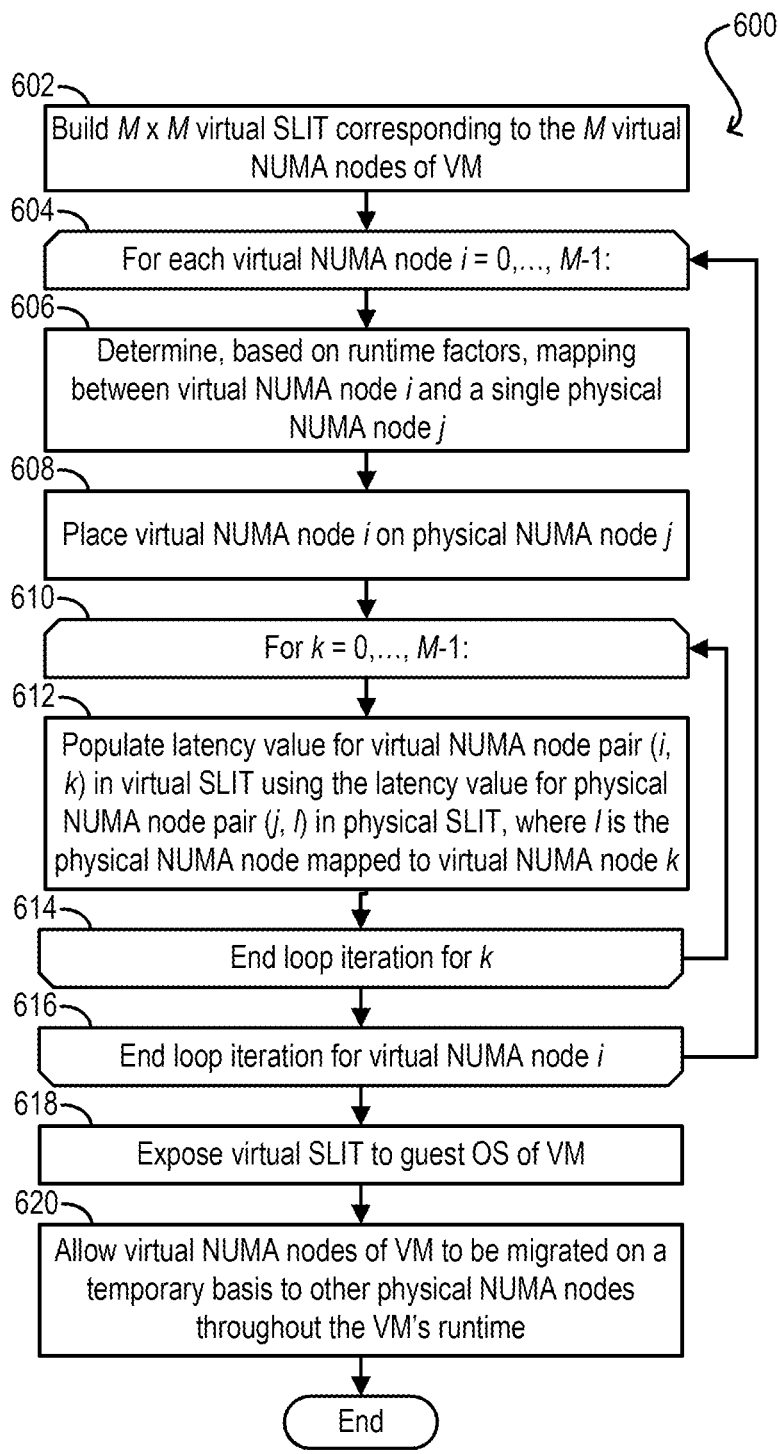
FIG. 6 depicts a workflow for exposing a virtual SLIT using dynamic placement according to certain embodiments.

FIG. 6 depicts a workflow 600 that may be carried out by hypervisor 102 of NUMA system 100 for exposing a virtual SLIT to a VM 104 using the dynamic placement approach according to certain embodiments. Like workflows 400 and 500 of FIGS. 4 and 5, it is assumed that hypervisor 102 performs workflow 600 prior to initiating execution of VM 104 (e.g., at the time of VM power-on). In addition, it is assumed that hypervisor 102 has assigned VM 104 a virtual NUMA topology comprising M virtual NUMA nodes 0, . . . , M−1 and physical NUMA topology 106 of NUMA system 100 comprises N physical NUMA nodes 0, . . . , N−1.

Starting with block 602, hypervisor 102 can build an M×M virtual SLIT, where the rows and columns of the virtual SLIT correspond to the M virtual NUMA nodes of VM 104.

At block 604, hypervisor 102 can enter a first loop for each virtual NUMA node i=0, . . . , M−1. Within this first loop, hypervisor 102 can determine a mapping between virtual NUMA node i and a single physical NUMA node j based on various factors present at the time of workflow execution (e.g., current compute and memory loads on physical NUMA nodes) (block 606). Note that this is different than the one-to-one static placement approach, which determines this mapping based on static user configuration. Hypervisor 102 can then place virtual NUMA node i on physical NUMA node j (block 608).

Further, at block 610, hypervisor 102 can enter a second loop for k=0, . . . , M−1. Within this second loop, hypervisor 102 can populate the latency value for virtual NUMA node pair (i, k) in the virtual SLIT using the latency value for physical node pair (j, l) in the physical SLIT of NUMA system 100, where l is the physical NUMA node mapped to virtual NUMA node k (block 612). Hypervisor 102 can thereafter reach the end of the second and first loops (blocks 614 and 616) and repeat these loops as needed.

At block 618, hypervisor 102 can expose the virtual SLIT to the guest OS of VM 104. Finally, at block 620, hypervisor 102 can allow one or more virtual NUMA nodes of VM 104 to be migrated on a temporary basis to other physical NUMA nodes (i.e., nodes different from the one on which the virtual NUMA node is initially placed) throughout the VM's runtime.

In some embodiments, as part of block 620, hypervisor 102 can use hardware performance counters (or some other mechanism) to monitor VM 104's memory access patterns and determine whether the VM is memory bound (i.e., whether it spends most of its time on memory accesses). If VM 104 is not memory bound—which means that it does not spend the majority of its time waiting on memory accesses—the hypervisor may choose to migrate the VM's virtual NUMA nodes on a more permanent basis (as needed), rather than only temporarily. This is acceptable because the VM's performance is not significantly limited by the latency of its memory accesses in this scenario, and thus there is little or no upside from a performance perspective in keeping the VM's virtual NUMA nodes on their original physical NUMA nodes.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O.

Further, certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   assigning, by a hypervisor running on a non-uniform memory access (NUMA) computer system, a virtual NUMA topology to a virtual machine (VM), the virtual NUMA topology including a plurality of virtual NUMA nodes;
   determining a virtual NUMA locality table for the VM in accordance with a physical NUMA locality table of the NUMA computer system, wherein the physical NUMA locality table comprises latency values for a plurality of physical NUMA nodes of the NUMA computer system, and wherein latency values in the virtual NUMA locality table are based on:
   mappings between the plurality of virtual NUMA nodes and the plurality of physical NUMA nodes; and
   updating the virtual NUMA locality table in response to migration of a virtual NUMA node; and
   exposing the virtual NUMA locality table to a guest operating system (OS) of the VM.

2. The method of claim 1 wherein the mappings include a mapping between the virtual NUMA node and a single physical NUMA node in the plurality of physical NUMA nodes.

3. The method of claim 2 wherein the virtual NUMA node is pinned to the single physical NUMA node, such that the virtual NUMA node cannot be migrated to any other physical NUMA node throughout a runtime of the VM.

4. The method of claim 2 wherein the mappings are based on a user-provided configuration.

5. The method of claim 1 wherein the mappings comprise a mapping between the virtual NUMA node and a set of physical NUMA nodes in the plurality of NUMA nodes that the virtual NUMA node is affinitized to.

6. The method of claim 5 wherein the latency value for a virtual NUMA node pair (i, j) in the virtual NUMA locality table is an average of latency values for all physical NUMA node pairs (m, n) in the physical NUMA locality table, wherein m is a physical node in the set of physical NUMA nodes that virtual NUMA node i is affinitized to, and wherein n is a physical node in the set of physical NUMA nodes that virtual NUMA node j is affinitized to.

7. The method of claim 1 wherein the mappings include, for each virtual NUMA node in the plurality of virtual NUMA nodes, a mapping between the virtual NUMA node and a single physical NUMA node in the plurality of physical NUMA nodes,
   wherein the virtual NUMA node is initially placed on the single physical NUMA node, and
   wherein the virtual NUMA node is allowed to temporarily migrate to other physical NUMA nodes during runtime of the VM.

8. A non-transitory computer readable storage medium having stored thereon program code executable by a hypervisor of a non-uniform memory access (NUMA) computer system, the program code embodying a method comprising:
   assigning a virtual NUMA topology to a virtual machine (VM), the virtual NUMA topology including a plurality of virtual NUMA nodes;
   determining a virtual NUMA locality table for the VM in accordance with a physical NUMA locality table of the NUMA computer system, wherein the physical NUMA locality table comprises latency values for a plurality of physical NUMA nodes of the NUMA computer system, and wherein latency values in the virtual NUMA locality table are based on:
   mappings between the plurality of virtual NUMA nodes and the plurality of physical NUMA nodes;
   updating the virtual NUMA locality table in response to migration of a virtual NUMA node; and
   exposing the virtual NUMA locality table to a guest operating system (OS) of the VM.

9. The non-transitory computer readable storage medium of claim 8 wherein the mappings comprise a mapping between the virtual NUMA node and a single physical NUMA node in the plurality of physical NUMA nodes.

10. The non-transitory computer readable storage medium of claim 9 wherein the virtual NUMA node is pinned to the single physical NUMA node, such that the virtual NUMA node cannot be migrated to any other physical NUMA node throughout runtime of the VM.

11. The non-transitory computer readable storage medium of claim 9 wherein the mappings are based on a user-provided configuration.

12. The non-transitory computer readable storage medium of claim 8 wherein the mappings comprises a mapping between the virtual NUMA node and a set of physical NUMA nodes in the plurality of NUMA nodes that the virtual NUMA node is affinitized to.

13. The non-transitory computer readable storage medium of claim 12 wherein the latency value for a virtual NUMA node pair (i, j) in the virtual NUMA locality table is an average of latency values for all physical NUMA node pairs (m, n) in the physical NUMA locality table, wherein m is a physical node in the set of physical NUMA nodes that virtual NUMA node i is affinitized to, and wherein n is a physical node in the set of physical NUMA nodes that virtual NUMA node j is affinitized to.

14. The non-transitory computer readable storage medium of claim 8 wherein the mappings include, for each virtual NUMA node in the plurality of virtual NUMA nodes, a mapping between the virtual NUMA node and a single physical NUMA node in the plurality of physical NUMA nodes,
wherein the virtual NUMA node is initially placed on the single physical NUMA node, and
wherein the virtual NUMA node is allowed to temporarily migrate to other physical NUMA nodes during runtime of the VM.

15. A non-uniform memory access (NUMA) computer system comprising:
a hypervisor;
a plurality of physical NUMA nodes; and
a non-transitory computer readable medium having stored thereon program code that causes the hypervisor to:
assign a virtual NUMA topology to a virtual machine (VM), the virtual NUMA topology including a plurality of virtual NUMA nodes;
determine a virtual NUMA locality table for the VM in accordance with a physical NUMA locality table of the NUMA computer system, wherein the physical NUMA locality table comprises latency values for the plurality of physical NUMA nodes, and wherein latency values in the virtual NUMA locality table are based on:
mappings between the plurality of virtual NUMA nodes and the plurality of physical NUMA nodes; and
updating the virtual NUMA locality table in response to migration of a virtual NUMA node; and
expose the virtual NUMA locality table to a guest operating system (OS) of the VM.

16. The NUMA computer system of claim 15 wherein the mappings comprise a mapping between the virtual NUMA node and a single physical NUMA node in the plurality of physical NUMA nodes.

17. The NUMA computer system of claim 16 wherein the virtual NUMA node is pinned to the single physical NUMA node, such that the virtual NUMA node cannot be migrated to any other physical NUMA node throughout runtime of the VM.

18. The NUMA computer system of claim 16 wherein the mappings are based on a user-provided configuration.

19. The NUMA computer system of claim 15 wherein the mappings include, for each virtual NUMA node in the plurality of virtual NUMA nodes, a mapping between the virtual NUMA node and a set of physical NUMA nodes in the plurality of NUMA nodes that the virtual NUMA node is affinitized to.

20. The NUMA computer system of claim 19 wherein the latency value for a virtual NUMA node pair (i, j) in the virtual NUMA locality table is an average of latency values for all physical NUMA node pairs (m, n) in the physical NUMA locality table, wherein m is a physical node in the set of physical NUMA nodes that virtual NUMA node i is affinitized to, and wherein n is a physical node in the set of physical NUMA nodes that virtual NUMA node j is affinitized to.

* * * * *